US012208496B2

(12) United States Patent
Ma

(10) Patent No.: US 12,208,496 B2
(45) Date of Patent: Jan. 28, 2025

(54) TERMINAL SUPPLY CLIP

(71) Applicant: Weidmüller Interface GmbH & Co. KG, Detmold (DE)

(72) Inventor: Yunchang Ma, Beijing (CN)

(73) Assignee: Weidmiiller Interface GmbH & Co. KG (DE)

( * ) Notice: Subject to any disclaimer, the term of this patent is extended or adjusted under 35 U.S.C. 154(b) by 525 days.

(21) Appl. No.: 17/623,959

(22) PCT Filed: Jun. 24, 2020

(86) PCT No.: PCT/CN2020/098091
§ 371 (c)(1),
(2) Date: Dec. 30, 2021

(87) PCT Pub. No.: WO2021/004288
PCT Pub. Date: Jan. 14, 2021

(65) Prior Publication Data

US 2022/0329031 A1 Oct. 13, 2022

(30) Foreign Application Priority Data

Jul. 5, 2019 (CN) ........................ 201921044611.0

(51) Int. Cl.
*H01R 43/20* (2006.01)
*B25B 5/00* (2006.01)
*H01R 43/00* (2006.01)
*H01R 43/16* (2006.01)

(52) U.S. Cl.
CPC ............... *B25B 5/00* (2013.01); *H01R 43/20* (2013.01); *H01R 43/16* (2013.01)

(58) Field of Classification Search
CPC .. H01R 9/2675; H01R 4/4821; H01R 9/2683; H01R 4/4842; H01R 43/20; H01R 43/16; B25B 5/00
See application file for complete search history.

(56) References Cited

U.S. PATENT DOCUMENTS 3,579,789 A * 5/1971 Grente .................... H01F 41/10
29/739

FOREIGN PATENT DOCUMENTS

CN 205294213 U 6/2016
CN 205328185 U 6/2016
CN 205328186 U 6/2016
(Continued)

OTHER PUBLICATIONS

Cigarette Propeller; Document ID: CN 205294213 U; Date Published: 2016-06-08; Inventor: Chen, Hong; Date Filed: Jan. 14, 2016 (Year: 2016).*

*Primary Examiner* — Mahdi H Nejad
(74) *Attorney, Agent, or Firm* — Laubscher & Fretwell, P.C.

(57) ABSTRACT

A supply clip of a terminal includes a guide rail and a follow-up mechanism. The guide rail is used for placing terminals, and the follow-up mechanism includes a shell and a fixing column so that a lower end of the shell is sheathed on the guide rail through a notch in the shell. The fixing column is provided with a coil spring, and an outer end of the coil spring is fixedly connected at a position on a bottom of a sliding groove close to a front baffle so that the terminal placed between the shell and the front baffle is pushed forwards, thus implementing automatic supply of the terminal.

6 Claims, 1 Drawing Sheet

(56) References Cited

FOREIGN PATENT DOCUMENTS

| | | | | | |
|---|---|---|---|---|---|
| CN | 207275682 | U | | 4/2018 | |
| CN | 105914562 | B | * | 9/2018 | ............. H01R 43/20 |
| CN | 110311284 | A | * | 10/2019 | |
| CN | 210175941 | U | | 3/2020 | |
| EP | 3995420 | A1 | * | 5/2022 | ............. H01R 43/20 |
| JP | H05330640 | A | | 12/1993 | |

* cited by examiner

TERMINAL SUPPLY CLIP

This application is a § 371 National Stage Entry of PCT/CN2020/098081 filed Jun. 24, 2020. PCT/CN2020/098081 claims priority of CN 2019 210446110 filed Jul. 5, 2019. The entire content of these applications is incorporated herein by reference.

TECHNICAL FIELD

The invention relates to a terminal supply. More particularly, the invention relates to a supply clip of a terminal.

BACKGROUND OF THE INVENTION

With the rapid development of the power distribution industry, manual feeding of terminals one by one is inefficient, time-consuming and error-prone, which cannot meet the needs of intelligent and efficient production. Therefore, it is an inevitable trend to implement the automatic supply of terminals.

SUMMARY OF THE INVENTION

A primary object of the invention is to provide a supply clip of a terminal. The clip includes a guide rail and a follow-up mechanism. The guide rail is used for placing terminals. The follow-up mechanism includes a shell and a fixing column so that a lower end of the shell is sheathed on the guide rail through a notch in the shell. The fixing column is provided with a coil spring, and an outer end of the coil spring is fixedly connected at a position on a bottom of a sliding groove close to a front baffle so that the terminal placed between the shell and the front baffle is pushed forwards, thus implementing the automatic supply of the terminal.

In order to realize these objectives and other advantages according to the invention, a supply clip of a terminal is provided which includes a guide rail having a top surface containing a sliding groove in a length direction of the guide rail, and two ends of the guide rail are fixedly connected with a front baffle and a rear baffle, respectively. The terminal also includes a follow-up mechanism including a shell having an open lower end and notches are symmetrically arranged at a front side bottom and a rear side bottom of the shell. The length of the notch in a width direction of the guide rail is slightly larger than a width of the guide rail. The follow-up mechanism further includes a fixing column arranged in the shell in the width direction of the guide rail. Two ends of the fixing column are fixedly connected with a left side and a right side of the shell, respectively. A coil spring is sheathed on an outer side wall of the fixing column, an inner end of the coil spring is fixedly connected with the outer side wall of the fixing column. An outer end of the coil spring penetrates out of the shell through the notch and is fixedly connected at a position on a bottom of the sliding groove close to the front baffle. The width of the coil spring is smaller than that of the sliding groove, and a top surface of the coil spring does not protrude from the sliding groove.

Preferably, a first opening is arranged on a top surface of the shell close to the front side face, and a second opening communicating with the first opening is arranged on the front side face of the shell. A positioning mechanism is arranged in the shell and includes a rotating column arranged in parallel with the fixing column and located above the guide rail, wherein two ends of the rotating column are rotatably connected with the left side and right side of the shell, respectively. The rotating column is provided with a through hole in a length direction of the rotating column. A central axis of the through hole does not coincide with a central axis of the rotating column. A positioning column is arranged on an outer side wall of the rotating column in a radial direction of the rotating column, and an upper end of the positioning column penetrates out of the shell through the first opening or the second opening; and The positioning mechanism also includes a positioning block fixedly connected with the outer side wall of the rotating column. When the positioning column is located in the first opening, the positioning block does not contact with the bottom of the sliding groove, and when the positioning column is located in the second opening, the positioning block abuts against the bottom of the sliding groove.

Preferably, the supply clip of the terminal further includes a limiting column arranged in the shell, wherein the limiting column is arranged in parallel with the fixing column, two ends of the limiting column are fixedly connected with the left side and the right side of the shell respectively, a sleeve is sheathed on an outer side wall of the limiting column, and two ends of the sleeve are slidably clamped with the sliding groove.

A plurality of vertically arranged positioning rods are fixedly arranged at a middle of the bottom of the guide rail in a length direction of the guide rail. Two pairs of rotating shafts are arranged in the shell in the width direction of the guide rail and symmetrically arranged on two sides of the positioning rods, respectively. Central axes of the two pairs of rotating shafts are all located in a same horizontal plane with one end of the two pairs of rotating shafts fixedly connected with a lower portion of an inner side wall of the shell, respectively. One roller is sheathed on each of outer side walls of the other ends of the two pairs of rotating shafts. The farthest distance between the two rollers in the width direction of the guide rail is slightly smaller than the width of the guide rail.

Preferably, a rear side face of the front baffle is provided with a silica gel pad, and a top surface of the guide rail is sprayed with a smooth paint layer.

The shell is pulled to move on the guide rail through the coil spring sheathed on the outer side wall of the fixing column, so that the terminal placed between the shell and the front baffle is pushed forwards, thus pulling out the terminal upwards under the action of an additional upward force, while the shell is pulled to push the terminal to move forwards through the coil spring. The terminals are continuously pulled out upwards at the same position, thus implementing automatic supply of the terminals.

The positioning mechanism includes the rotating column and the positioning block. The central axis of the through hole arranged in the rotating column does not coincide with the central axis of the rotating column. The positioning block is arranged on the outer side wall of the rotating column to rotate the rotating column. When the positioning block abuts against the bottom of the sliding groove, the shell is positioned on the guide rail to facilitate mounting the terminal on the guide rail, and when the positioning block does not contact with the bottom of the sliding groove, the shell moves on the guide rail under retraction of the coil spring to facilitate pushing the terminal to move forwards.

The sleeve is sheathed on the outer side wall of the limiting column, and two ends of the sleeve are slidably clamped with the sliding groove so that the shell is limited to move on the guide rail in a length direction of the sliding groove.

The guide rail is limited between the roller and the sleeve, thus improving running stability of the shell.

BRIEF DESCRIPTION OF THE DRAWINGS

Other objects and advantages of the invention will become apparent from a study of the following description when viewed in the light of the accompanying drawing, in which.

DETAILED DESCRIPTION

It should be noted that all of the experimental methods in the following embodiments are conventional methods without special instructions, and all the reagents and materials can be obtained from commercial channels without special instructions. In the description of the invention, the orientations or position relationships indicated by the terms "transverse", "longitudinal", "upper", "lower", "front", "rear", "left", "right", "vertical", "horizontal", "top", "bottom", "inside", "outside", and the like, are based on the orientations or position relationships shown in the accompanying drawings, which are only for the convenience of description of the utility model and simplification of the description, and are not to indicate or imply that the indicated device or element must have a specific orientation, and be constructed and operated in a specific orientation. Therefore, the terms shall not be understood as limiting the utility model.

Figure 1:
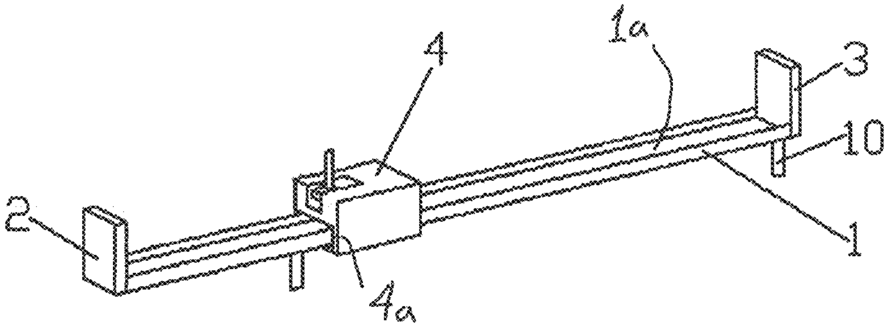
FIG. 1 is a schematic structural diagram of a side of a clip according to an embodiment of the invention.
Figure 2:
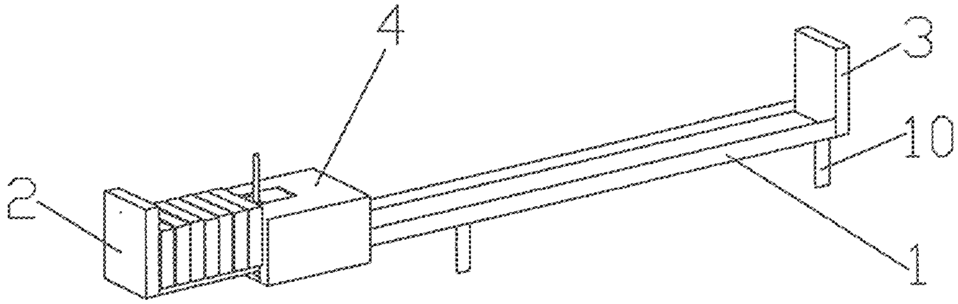
FIG. 2 is a schematic structural diagram of a side of a clip according to another embodiment of the invention.
Figure 3:
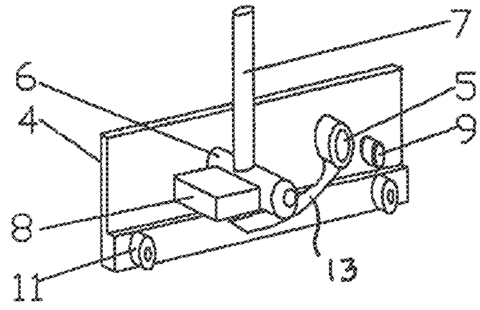
FIG. 3 is a schematic structural diagram of a profile of a follow-up mechanism according to another embodiment of the invention.
Figure 4:
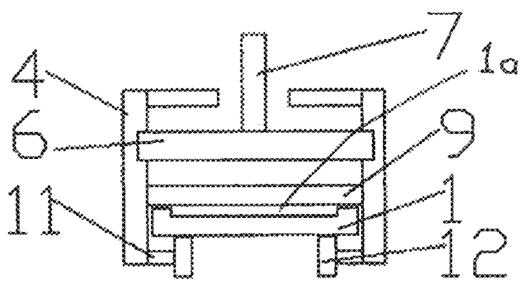
FIG. 4 is a schematic structural diagram of a cross section of the follow-up mechanism according to another embodiment of the invention.

As shown in FIG. 1 to FIG. 4, the invention relates to a supply clip of a terminal, which includes a guide rail 1, wherein a top surface of the guide rail is provided with a sliding groove 1*a* in a length direction of the guide rail, and two ends of the guide rail 1 are fixedly connected with a front baffle 2 and a rear baffle 3 respectively. The supply clip further includes a follow-up mechanism including a shell 4 having an open lower end. Notches 4*a* are symmetrically arranged at a front side bottom and a rear side bottom of the shell 4, and a length of the notch in a width direction of the guide rail 1 is slightly larger than a width of the guide rail 1, so that the guide rail 1 is located in the notch with the shell 4 sheathed outside the guide rail 1. The follow-up mechanism also includes a fixing column 5 arranged in the shell 4 in the width direction of the guide rail 1. Two ends of the fixing column 5 are fixedly connected with a left side and a right side of the shell, respectively. A coil spring 13 is sheathed on an outer side wall of the fixing column 5. An inner end of the coil spring is fixedly connected with the outer side wall of the fixing column 5 and an outer end of the coil spring penetrates out of the shell 4 through the notch and is fixedly connected at a position on a bottom of the sliding groove close to the front baffle 2. The width of the coil spring is smaller than that of the sliding groove so that the outer end of the coil spring is located in the sliding groove and the shell 4 is pulled to move through the coil spring, and a top surface of the coil spring does not protrude from the sliding groove.

The supply clip of the terminal includes the guide rail 1 and the follow-up mechanism. A plurality of terminals are sequentially placed on the guide rail 1 in the length direction of the guide rail 1. The bottom of each terminal is provided with a strip-shaped groove slidably clamped with the top surface of the guide rail 1. Different terminals have different shapes, but the strip-shaped grooves on the bottoms of different terminals are the same so that the guide rail 1 is suitable for different terminals. The follow-up mechanism includes the shell 4 and the fixing column 5, so that the lower end of the shell 4 is sheathed on the guide rail 1 through the notch in the shell 4. The fixing column 5 is provided with the coil spring, and the outer end of the coil spring is fixedly connected at the position on the bottom of the sliding groove close to the front baffle 2 so that the terminal placed between the shell 4 and the front baffle 2 is pushed forwards. In an actual operation process, the plurality of terminals to be mounted are clamped on the guide rail 1 between the front baffle 2 and the follow-up mechanism through the strip-shaped grooves on the bottoms of the terminals. When one terminal closest to the front baffle 2 is pulled out upwards by a clamping jaw, the shell 4 is pulled through the coil spring, and the shell 4 pushes the remaining terminals to move forwards, so that the clamping jaw pulls out the terminals upwards at a same position continuously, thus providing automatic supply of the terminals. The action of pulling out the clamping jaw is a process of moving the terminals to be mounted upwardly. The terminals that are not pulled out are still firmly clamped on the guide rail 1 due to friction between the strip-shaped grooves on the bottoms of the terminals and the outer side wall of the guide rail 1 and will not be pulled out together to affect the action of sequentially pulling out the terminals upwards by the clamping jaw, thus improving a supply efficiency of the terminals.

In another embodiment of the supply clip of the terminal, a first opening is arranged on a top surface of the shell 4 close to the front side face, and a second opening communicated with the first opening is arranged on the front side of the shell 4. A positioning mechanism arranged in the shell 4 is further included, and the positioning mechanism includes a rotating column 6 arranged in parallel with the fixing column 5 and located above the guide rail 1. Two ends of the rotating column 6 are rotatably connected with the left side and right side of the shell 4 respectively. The rotating column 6 is provided with a through hole in a length direction of the rotating column and a central axis of the through hole does not coincide with a central axis of the rotating column 6. Accordingly, a center of gravity of the rotating column 6 is not located on the central axis of the rotating column. A positioning column 7 is arranged on an outer side wall of the rotating column 6 in a radial direction of the rotating column, and an upper end of the positioning column 7 penetrates out of the shell 4 through the first opening or the second opening. A positioning block 8 is fixedly connected with the outer side wall of the rotating column 6. The positioning block 8 is arranged as follows. When the positioning column 7 is located in the first opening, the positioning block 8 does not contact with the bottom of the sliding groove and the shell 4 is pulled to move on the guide rail 1 through the coil spring. When a force is applied to the positioning column 7 to enable the positioning column 7 to be located in the second opening, the positioning block 8 abuts against the bottom of the sliding groove so that the shell 4 does not move any more, and the shell 4 stands still at a position where the positioning block 8 abuts against the bottom of the sliding groove.

In another embodiment, the supply clip of the terminal further includes a limiting column 9 arranged in the shell 4. The limiting column 9 is arranged in parallel with the fixing column 5, and two ends of the limiting column 9 are fixedly connected with the left side and the right side of the shell 4 respectively. A sleeve is sheathed on an outer side wall of the limiting column 9, and two ends of the sleeve are slidably clamped with the sliding groove, so that the sleeve is limited in the sliding groove. The sleeve can only move in the length direction of the sliding groove. Therefore, the sleeve 4 can only move in the length direction of the sliding groove to avoid deviation of the shell 4.

In another embodiment of the supply clip of the terminal, a plurality of vertically arranged positioning rods 10 are fixedly arranged at a middle of the bottom of the guide rail 1 in a length direction of the guide rail. When the clip is in operation, the lower end of the positioning rod 10 is fixed on a fixing plate in a clip storage to ensure the stability of the clip, thus quickly supplying wiring terminals in an electrical cabinet assembly. Two pairs of rotating shafts 11 arranged in the shell 4 in the width direction of the guide rail 1 are further included. The two pairs of rotating shafts 11 are symmetrically arranged on two sides of the positioning rods 10, respectively, and central axes of the two pairs of rotating shafts 11 are all located in the same horizontal plane. One end of the each of the two pairs of rotating shafts 11 are fixedly connected with a lower portion of an inner side wall of the shell 4, respectively, and one roller 12 is sheathed on each of outer side walls of the other ends of the two pairs of rotating shafts 11. A farthest distance between the two rollers 12 in the width direction of the guide rail 1 is slightly smaller than the width of the guide rail 1 so that when the shell 4 moves in the length direction of the guide rail 1, the rollers 12 contact with the bottom of the guide rail 1 and roll in the length direction of the guide rail 1.

In another embodiment of the supply clip of the terminal, the rear side face of the front baffle 2 is provided with a silica gel pad to avoid the terminal placed between the front baffle 2 and the shell 4 from colliding with the front baffle 2 under a pulling force of the coil spring from being damaged.

In another embodiment of the supply clip of the terminal, a top surface of the guide rail 1 is sprayed with a smooth paint layer to reduce friction between the shell 4 and the top surface of the guide rail 1 during running.

Although the embodiments of the utility model have been disclosed above, the invention is not limited to the applications listed in the description and the embodiments. The invention can be applied to various fields, and other modifications can be easily realized by those skilled in the art. Therefore, the invention is not limited to the specific details and the illustrations shown and described herein without departing from the general concepts set forth above.

The invention claimed is:

1. A supply clip of a terminal, comprising:

(a) a guide rail, wherein a top surface of the guide rail is provided with a sliding groove in a length direction of the guide rail, and two ends of the guide rail are connected with a front baffle and a rear baffle respectively; and (b) a follow-up mechanism, including:

(1) a shell having front, rear, top, and side walls and an open lower end, said front and rear walls containing notches symmetrically arranged at a side bottom portion thereof, a length of each notch in a width direction of the guide rail being slightly larger than a width of the guide rail;

(2) a fixing column arranged in the shell in the width direction of the guide rail, wherein two ends of the fixing column are fixedly connected with a left side and a right side wall of the shell, respectively; and (3) a coil spring sheathed on an outer side wall of the fixing column, wherein an inner end of the coil spring is fixedly connected with the outer side wall of the fixing column and an outer end of the coil spring extends from the shell through the notches and is fixedly connected at a position on a bottom of the sliding groove adjacent to the front baffle, a width of the coil spring being smaller than that of the sliding groove, and a top surface of the coil spring remaining within the sliding groove.

2. The supply clip of the terminal according to claim 1, wherein the top wall of the shell contains a first opening close to the front wall of the shell, and the front wall of the shell contains a second opening communicating with the first opening, and further comprising a positioning mechanism arranged in the shell, said positioning mechanism including:

(a) a rotating column arranged in parallel with the fixing column and located above the guide rail, wherein ends of the rotating column are rotatably connected with the left side wall and the right side wall of the shell, respectively, the rotating column containing a through hole in a length direction of the rotating column, a central axis of the through hole being offset from a central axis of the rotating column;

(b) a positioning column arranged on an outer side wall of the rotating column in a radial direction of the rotating column, an upper end of the positioning column extending from the shell through the first opening or the second opening; and (c) a positioning block fixedly connected with the outer side wall of the rotating column, wherein when the positioning column is located in the first opening, the positioning block does not contact the bottom of the sliding groove and when the positioning column is located in the second opening, the positioning block abuts against the bottom of the sliding groove.

3. The supply clip of the terminal according to claim 1, further comprising a limiting column arranged in the shell parallel with the fixing column with opposite ends of the limiting column being fixedly connected with the left side wall and the right side wall of the shell, respectively, and a sleeve sheathed on an outer side wall of the limiting column with opposite ends of the sleeve being slidably clamped with the sliding groove.

4. The supply clip of the terminal according to claim 3, further comprising:

(a) a plurality of vertically arranged positioning rods fixedly arranged at a middle of a bottom of the guide rail in the length direction of the guide rail;

(b) two pairs of rotating shafts arranged in the shell in the width direction of the guide rail and symmetrically arranged on two sides of the positioning rods, respectively, wherein central axes of the two pairs of rotating shafts are all located in a same horizontal plane, one end of the two pairs of rotating shafts being fixedly connected with a lower portion of an inner side wall of the shell, respectively; and (c) two rollers, each roller sheathed on an outer side wall of the other end of a respective one of the two pairs of rotating shafts, a distance between outer side faces of the two rollers in the width direction of the guide rail being slightly smaller than the width of the guide rail.

5. The supply clip of the terminal according to claim 1, wherein a rear side of the front baffle is provided with a silica gel pad.

6. The supply clip of the terminal according to claim 1, wherein the top surface of the guide rail is sprayed with a smooth paint layer.

* * * * *